(12) United States Patent
Manrique et al.

(10) Patent No.: US 9,109,443 B2
(45) Date of Patent: *Aug. 18, 2015

(54) FORMULATION AND METHOD OF USE FOR EXPLOITATION OF HEAVY AND EXTRA HEAVY OIL WELLS

(75) Inventors: Pablo Manrique, Caracas (VE); Franklin Archer, Caracas (VE); Maria Gracia Araujo, Barinas (VE)

(73) Assignee: Intevep, S.A., Caracas (VE)

( * ) Notice: Subject to any disclaimer, the term of this patent is extended or adjusted under 35 U.S.C. 154(b) by 359 days.

This patent is subject to a terminal disclaimer.

(21) Appl. No.: 13/474,769

(22) Filed: May 18, 2012

(65) Prior Publication Data

US 2012/0247759 A1 Oct. 4, 2012

Related U.S. Application Data

(63) Continuation-in-part of application No. 12/973,022, filed on Dec. 20, 2010.

(60) Provisional application No. 61/549,631, filed on Oct. 20, 2011.

(51) Int. Cl.
*E21B 43/20* (2006.01)
*C09K 8/60* (2006.01)

(52) U.S. Cl.
CPC .............. *E21B 43/20* (2013.01); *C09K 8/602* (2013.01)

(58) Field of Classification Search
CPC ............................... E21B 43/20; C09K 8/602
USPC ............................ 166/300, 270.1, 400, 272.3
See application file for complete search history.

(56) References Cited

U.S. PATENT DOCUMENTS

| | | | | |
|---|---|---|---|---|
| 3,977,471 A | * | 8/1976 | Gale et al. | 166/270.1 |
| 4,068,716 A | * | 1/1978 | Allen | 166/271 |
| 4,122,895 A | * | 10/1978 | Sitton et al. | 166/252.3 |
| 4,296,812 A | * | 10/1981 | Kalfoglou | 166/270.1 |
| 6,929,070 B2 | * | 8/2005 | Fu et al. | 166/308.2 |
| 8,148,303 B2 | * | 4/2012 | Van Zanten et al. | 507/103 |
| 2011/0160103 A1 | | 6/2011 | van Zanten et al. | |

* cited by examiner

*Primary Examiner* — Zakiya W Bates
*Assistant Examiner* — Silvana Runyan
(74) *Attorney, Agent, or Firm* — Bachman & LaPointe, PC (57) ABSTRACT

A combined injection and production method includes establishing a production well and an injection well into a hydrocarbon-bearing formation; introducing a mixture of a surfactant, a co-surfactant and a carrier fluid into each of the production well and the injection well so that the mixture flows into porous media surrounding the production well and the injection well; holding the mixture in the porous media surrounding the production well in the presence of water for a period of time sufficient to form a water film on surfaces of the porous media surrounding the production well; and injecting an injection fluid into the injection well while producing from the production well, whereby hydrocarbons flow from the porous media around the injection well toward the production well.

23 Claims, 8 Drawing Sheets

FORMULATION AND METHOD OF USE FOR EXPLOITATION OF HEAVY AND EXTRA HEAVY OIL WELLS

CROSS REFERENCE TO RELATED APPLICATIONS

This application is a continuation-in-part of U.S. patent application Ser. No. 12/973,022 which was filed on Dec. 20, 2010. This application also claims the benefit of provisional application 61/549,631 which was filed on Oct. 20, 2011.

BACKGROUND OF THE INVENTION

The invention relates to a formulation and method of using same for improving well productivity in hydrocarbon reservoirs, and use of the formulation in an exploitation method to improve the cold production recovery factor in heavy and extra heavy oil exploitation.

Improvement in productivity of heavy and extra heavy oil wells such as those found in the Orinoco River Belt in Venezuela is clearly desirable. Increase of the recovery factor in the cold exploitation of such reservoirs is a real need. Some of the largest reservoirs of heavy and extra heavy oil in the world are in Venezuela and hold oil having API gravity within the range of 6 to 16. Unfortunately, the production rate of much of this oil is unacceptable and the final oil recovery in those reservoirs is disappointing.

It is a high concern in the exploitation of heavy and extra heavy oil reservoirs to increase productivity of the well and the final oil-in-place recovery during the reservoir lifetime exploitation. With these wells, primary cold production schemes are quickly abandoned in favor of thermal methods to improve well flowability by reducing oil viscosity in the reservoirs. These processes are costly and also still produce a low output in terms of final recovery. They also have serious problems of sour gas production such as $H_2S$ and $CO_2$ which are very costly to address. Such thermal recovery methods typically produce final oil recovery below 20-30%.

Venezuelan heavy and extra heavy Orinoco River Belt oil sandstones are exceptional reservoirs. 60% of the reservoirs of this type have a KH/U value between 40 and close to 1,000 in very many cases. Unlike other reservoirs, however, the oil in Venezuelan extra heavy oil reservoirs is flowable at reservoir conditions.

Even these wells, however, have a final recovery by cold production which is very low and perhaps in most cases below three (3) percent of the original oil in place. The conditions for flow of oil in those reservoirs, with even excellent petrophysical properties, are very unfavorable to the flow of oil. The components of the heavy and extra heavy oil, particularly the asphaltenes in natural form in the native oil, are capable by natural fluid-rock interactions of generating an oil-wet condition at the surface of the natural mineral components of the sandstone. This produces the most adverse conditions to flow of oil in a porous media. This is a natural oil-wet condition of the reservoir media, which is a completely different condition as compared to formation damage in the well resulting from drilling or production activities, which could also happen in the well.

The need exists for improvement in production rates from wells producing from formations containing heavy and extra heavy wells, particularly those which contain asphaltenes and other hydrocarbons which lead to oil wet flow environments, and to improve the cold production final recovery of the original oil in place in such reservoirs.

SUMMARY OF THE INVENTION

As a response to the above problems, especially to the natural oil wet conditions of the sandstone and the extremely low well productivity and recovery of the original oil in place, the present invention provides a formulation or stimulation fluid and a method of using the formulation for improving well productivity in cold production schemes and an exceptional increase in the oil in place final recovery of the reservoir. The result is reflected by a better flow rate in the producing well, a lower pressure drawdown, and an improved oil recovery from the drainage area of the formation and the reservoir as a whole by fluid injection through an injection well in communication with the production well.

Injection wells are sometimes used as part of a production or exploitation scheme, wherein injection of fluids into one well drives fluids from the area of the injection well to a production well, where production rates are improved.

The formulation of the present invention can advantageously be used to improve the flow conditions at both the injection well and the production well and to allow mobilization of oil which is immobile in the porous media due to its affinity to the oil wet surface of the mineral of the rock due to the adsorption of the heavy component of the oil in the mineral surface, and particularly, the asphaltenes. This is done by changing the oil well condition of the surface to a new water wet condition.

In accordance with the invention, a combined injection and production method is therefore provided, which method comprises the steps of establishing a production well and an injection well in communication with the production well, into a hydrocarbon-bearing formation; introducing a mixture of a surfactant, a co-surfactant and a carrier fluid into each of the production well and the injection well so that the mixture flows into porous media surrounding the production well and the injection well; holding the mixture in the porous media around the production well in the presence of water for a period of time sufficient to form a water film on surfaces of the porous media of the production well; and continuously injecting the injection fluid into the injection well to form a water film on surfaces of the porous media to allow mobilization to the producing well of the immobile oil in the pore space of the formation by breaking away the affinity of such immobile oil to the original natural oil wet surface of the rock while producing said immobile oil from the production well as the injection fluid is flowing through the reservoir, whereby hydrocarbons and the injected fluid flow from the porous media around the injection well toward the production well.

BRIEF DESCRIPTION OF THE DRAWINGS

A detailed description of preferred embodiments of the present invention follows, with reference to the accompanying drawings, wherein.

DETAILED DESCRIPTION

The invention relates to a formulation for a stimulation and injection fluid which has a surfactant/co-surfactant mixture, and a method for using same to treat surfaces of a hydrocarbon bearing formation and thereby enhance flow of hydrocarbons through same. This method is advantageously used to alter flow conditions in the formation to improve production of hydrocarbons from hydrocarbon-bearing formations.

As mentioned above, many significant hydrocarbon deposits in the world contain very large quantities of hydrocarbons under conditions where it is very difficult to produce them. One example of this is asphaltene-bearing hydrocarbon deposits in the Orinoco River Belt of Venezuela. In these formations, which typically have high and low pressures in the range of 300-1,500 psi, the heavy hydrocarbon fractions contained in the formation, especially asphaltenes, tend to adhere to the pore surfaces of the hydrocarbon and thereby create an oil-wet environment in the reservoir. As detailed above, this oil-wet flow environment is not at all conducive to production of those hydrocarbons from the formation. Further, as will be demonstrated below, this asphaltene is not easily removed because a portion of the hydrocarbon adsorbs into the rock surface making even cleaned surfaces oil wet and, therefore, unfavorable for good hydrocarbon flow. Thus, hydrocarbons tend to be immobile in the porous media under these conditions. According to the invention, a water film is formed over the rock surfaces and also over the chemically adsorbed hydrocarbon so that the surfaces when coated in this manner are water wet. This greatly increases the flowability of hydrocarbons through the treated rock formation.

In accordance with the present invention, the surfactant/co-surfactant mixture is used to form a water film over the pore spaces of the formation, and also over the asphaltenes adhered to the pore surfaces, so as to provide a water-wet surface between the flow surfaces defined by the pore surface of the rock and asphaltene adhered thereto, and the volume of hydrocarbon in the formation which is intended to be produced. This water film increases flow of hydrocarbons through the formation and allows mobilization of oil which was immobile in the pore space due to affinity to the natural oil wet original surface, and thereby enhances production of hydrocarbon from the formation.

The mixture can advantageously be used to improve flow conditions both in injection and production wells. Over a period of time, in the case of the production well, the water film eventually is removed by fluids flowing past the film, at which point the surfactant/co-surfactant mixture of the present invention can again be introduced into the hydrocarbon bearing formation to again deposit a fresh water film for use in the next period of production. While re-establishing the water film at the production well, injection flow can be continued at the injection well.

According to the invention, the surfactant/co-surfactant mixture preferably contains surfactant, co-surfactant and a fluid carrier, each of which has the following preferred constituents.

The surfactant is preferably selected from the group consisting of anionic surfactants, cationic surfactants, non-ionic surfactants, amphoteric surfactants and combinations thereof. The surfactant is further preferably an ethoxylated nonyl phenol having between 4 and 60 ethoxylated groups.

Suitable non-ionic surfactants include but are not limited to octilphenol having 9-16 EO, nonylphenol with an EO number from 4 to 80, preferably 20-80, fatty acids of 9-20 EO, n-tetradecanol of 9-20 EO, n-hexadecanol of 9-20 EO, laurate of sorbitan, and ethoxylated fatty alcohols with EO number from 4 to 25, preferably 9-20. Suitable ionic surfactants include but are not limited to n-alkyl sulfates of K or Na, n-alkyl trimethyl ammonium chloride, petroleum sulfonates and combinations thereof.

The co-surfactant is preferably an alcohol co-surfactant, preferably one or more n-alcohols (C1-C6), and more preferably selected from the group consisting of methanol, ethanol, propanol, butanol, pentanol, isopropanol and combinations thereof. The most preferred co-surfactant is methanol and/or ethanol.

The carrier fluid can be the same or different for the injection well and the production well. The carrier fluid for treating the production well can be selected from the group consisting of water, brine, production water and organic solvents, light hydrocarbons, diluents, light crude oil and combinations thereof in the case of the organic carrier fluids. More specifically, the carrier fluid can be light oil, a light refinery cut, gasoil, diesel, diluent and water. The most preferred carrier fluid is water, brine and production water fluid. One example of water base carrier fluid is the production water of the field normally treated and delivered through disposal wells to the underground. Another carrier fluid is compatible light crude oils with API gravity between 20 and 45 API, preferably between 20 and 25 API. Also, some mixtures of compatible crude oil with the formation fluids and/or naphtha or diluents normally used downhole or on the surface for mixing with the native oil for reducing viscosity of the heavy and extraheavy oil stream for transportation in surface facilities can be used.

The carrier fluid for the injection well, on the other hand, can be selected from the group consisting of water, brine, production water, all of them treated for compatibility with the formation fluids and minerals present in the rock. The most preferred carrier fluid for the injection well is the production water. One example of water base carrier fluid is production water of the field which would normally be treated and delivered through disposal wells to the underground.

Exceptionally, in the case of very thin formations for example having a reservoir sand pack in the range of 3 to 7 feet, organic fluids like solvents, light hydrocarbons, diluents, light crude oil and combinations thereof could be used as a carrier fluid for the injection well.

The surfactant/co-surfactant mixture can generally be used in substantially equal amounts by volume, and each can have a concentration in the carrier fluid of between 0.001 and 5.0% by volume, preferably between 0.01 and 3.0% by volume. According to one aspect of the invention, the fluid may be prepared in different concentrations depending upon whether it is to be used at an injection well or a producing well.

The surfactant/co-surfactant mixture for the producing well is preferably prepared having substantially equal amounts by volume of the surfactant and co-surfactant, and the overall mixture with carrier fluid in the production well preferably contains each of the surfactant and co-surfactant in an amount between 0.5 and 5% by volume, more preferably between 1 and 4% by volume.

The surfactant/co-surfactant mixture for the injection well is preferably prepared having substantially equal amounts by volume of the surfactant and co-surfactant, and the overall mixture with carrier fluid preferably contains each of the surfactant and co-surfactant in an amount between 0.001 and 3% by volume, more preferably between 0.01 and 0.5% by volume.

In accordance with the invention, the surfactant/co-surfactant mixture can be prepared by mixing the above-identified constituents at the surface and then transporting, for example by pumping, the resulting mixture or stimulation fluid into a hydrocarbon producing formation, for example through a well positioned from the surface to the subterranean formation, so that the mixture penetrates into the hydrocarbon-bearing formation around the well, typically into a radius surrounding the well of at least about 2 inches, preferably between 12 inches and as large as possible, for example up to 10 feet when it is squeezed into the producing well, or otherwise pumping the stimulation fluid into the formation and letting it naturally flow through the best channel of flow in the sandstone, which may be a good approach for horizontal wells. The penetration area into the formation is the area to be treated in accordance with the present invention.

Several different means can be used to allow a controlled distribution of fluid in the sandstone while injecting the fluid in to the formation. In horizontal injection wells or vertical injection wells an improvement in the selected placement or distribution of the fluid in vertical heterogeneous sand packs or a very long horizontal zone through the sand can be done through use of downhole packers and/or isolation packers including means in such tools for flow rate control and open and close control position systems operated at the surface.

In the injection well, the fluid is normally injected by natural flow due to the low pressure in the formation (200 to 1200 psi) and the hydrostatic column weight (1500 ft to 4000 ft). The injected fluid is injected at a very low flow rate to allow gradual contact of the injected fluid with the mineral rock surface and to allow formation of the water film over the hydrocarbon adsorbed on the mineral surface of the rock. As the water film is being formed by continuous injection of the injected fluid to the formation by means of the injection well, the oil in the porous media which had been immobile due to its affinity with the natural oil wet condition of the pore surface starts mobilization to the producing well. By this drainage mechanism, the water-based injection fluid is capable of producing an exceptionally high recovery of up to 55% vol. of the initial oil in place (IOIP) as shown in the examples of displacement test presented below. This is true even though the viscosity of the injected water is very low compared with the viscosity of the heavy oil, and this is believed to be because the increase in the oil recovery is not by a piston like displacement pattern mechanism of the injected fluid through the injection well.

Once a sufficient volume of fluid is pumped into the formation, this volume is then held in place in the formation at the production well in the presence of water for a time sufficient to form the desired water film over surfaces of the pore spaces of the hydrocarbon and also over the hydrocarbons adhered to these surfaces. This advantageously provides a water-wet flow environment which is advantageous to the flow of hydrocarbon through the porous media, and therefore produces a flow environment which is far more conductive to the flow of oil than the natural oil-wet flow environment present in the well under natural formation conditions wherein the heavy hydrocarbons, and especially asphaltenes, are adhered to the pore surfaces of the porous media. The suitable amount of time to hold the fluid in the formation will vary with different wells, fluids and conditions, but will typically be between 12 and 24 hours in the production well before restart of flow, and a preferred range of time is between 18 and 24 hours. In the injection well the change from oil wet to water wet on the surface of the porous media is made while the injected fluid is flowing and contacting the porous media through continuous injection through the injection well.

Production from the treated well can be conducted while monitoring pressure drawdown in the well, and when the pressure drop increases, lowering the intake pump pressure, the formation can be treated again in accordance with the present invention. In the injection well, monitoring should be made to evaluate the injection fluid front and the pattern of flow in the formation by using controlling/monitoring wells or tracers in the injection fluid. Also the injection well should be selected from a location of the reservoir so as to allow distribution of the injected fluid in the surface of the porous media helped by the gravitational effect and density differential effects between the fluids. If the oil is of lower density than the water, the injection well will be preferred to be located at the upper part of the reservoir.

The typical formation for which the present invention can be utilized can be any formation wherein the forming of a water film over the pore surfaces would be beneficial to the overall hydrocarbon production from the formation. A particularly desirable application of the present invention is in formations having hydrocarbons with an API gravity of between 6 and 16, and even more preferably in formations containing hydrocarbons having an API gravity of between 6 and 12. These heavy and extra heavy hydrocarbon deposits in certain areas typically are very large in volume, but also contain asphaltenes as discussed above, and these are ideal candidates for treatment according to the present invention to enhance production. The typical rock formations containing such hydrocarbons have pore spaces which define the void volume which holds the hydrocarbons and which creates the permeability that allows the hydrocarbons to flow. The rock defining the pore surfaces of these formations are typically defined by quartz, feldspar, siliceous mineral, carbonaceous mineral, clays and combinations thereof.

Figure 1:
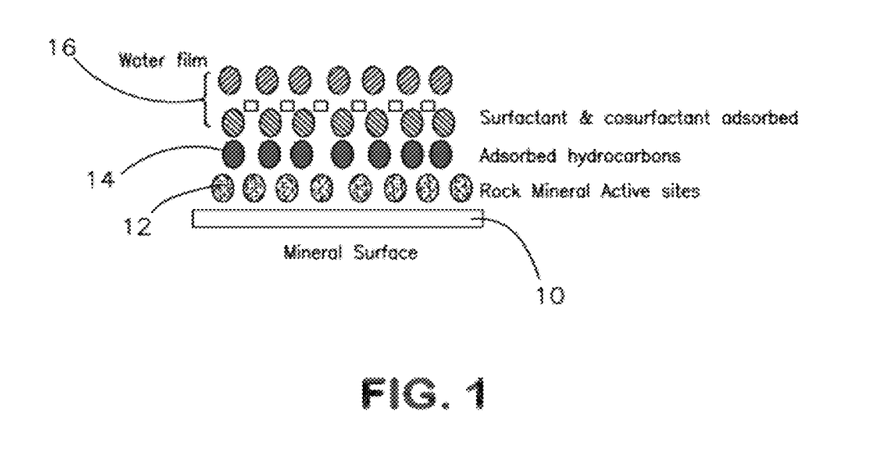
FIG. 1 schematically illustrates a treated surface in accordance with the invention.

FIG. 1 schematically illustrates a surface of a hydrocarbon bearing formation treated in accordance with the present invention. As seen in FIG. 1, a mineral surface 10 which defines the pore space of the formation has rock mineral active sites 12 along surface 10, and these rock mineral active sites 12 interact with hydrocarbons under the typical pressure in the formation such that chemically adsorbed hydrocarbons 14 are closely adhered to surface 10, particularly at rock mineral active sites 12.

According to the invention, the surfactant/co-surfactant mixture of the present invention is introduced to the formation and held there in the presence of water so that a film of water is formed over the adsorbed hydrocarbons 14 as well as the rock mineral active sites 12 of mineral surface 10. FIG. 1 shows surfactant/co-surfactant mixture adsorbed in the form of water film 16 which is schematically illustrated as a double layer to represent the surfactant/co-surfactant mixture. This produces a water-wet condition at the surface, which enhances flow of hydrocarbon through flow areas and pore space defined by such a treated surface. The water which forms the film can be water already present in the rock formation fluids and/or from the carrier fluid if a water containing carrier fluid is used. The water salinity can be in the range between 800 ppm up to 45,000 ppm.

Pressure drawdown, or the pressure drop from the formation to the well bore, is a good measure of the flowability in the formation. When the pressure drawdown is relatively small, this indicates good flowing properties in the formation to the well. While producing from a well that has been treated according to the invention, it is desirable at the production well to monitor the pressure drawdown, and after a certain amount of oil has been produced from a treated production well, the pressure drawdown starts to increase. This increase in pressure drawdown indicates that the water film has been worn away or removed due to relatively high velocity flow of well fluids passing over the film to the well. This stream removes the water film by desorption of the surfactant and co-surfactant from the mineral surface and restoring the natural oil-wet initial condition at the mineral surface. At this stage, according to the invention, the production well can be treated again with the same formulation, and this process can be repeated as many times as necessary until no more hydrocarbon fluids flow to the well even after treatment or an economical limit is reached to abandon the well. With cyclic stimulation, the porous media will improve final recovery of the initial oil in place in the drainage area by cold production by potentially many times the amount of 3% typically reported as the well output obtained without stimulation.

In the injection well, as the injected fluid is continuously being injected to the formation; monitoring of the pressure drop is also suggested. The present invention reduces the time and need of costly thermal processes to reach a level of about 40% of initial oil in place recovery by cold methods which is a cheaper and safer recovery.

Figure 2:
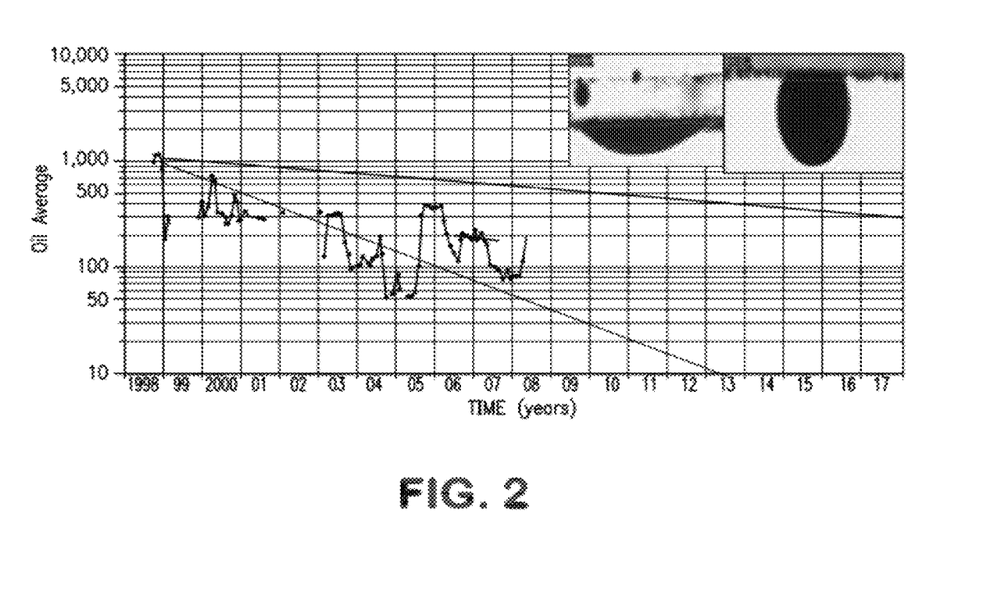
FIG. 2 illustrates typical and preferred flow rates from the hydrocarbon producing well.

FIG. 2 illustrates typical and desired flow rates from a hydrocarbon production well. The starts and stops shown in actual flow show a trend (line A) which is not desirable, while a preferred pressure behavior is shown at line B. The difference of the area between lines A and line B is an indication of greater recovery of oil from same well in same well drained area.

In the aforesaid discussion, the mixture of surfactant and co-surfactant in accordance with the present invention can advantageously be utilized in an injection and production method to even further enhance oil recovery from an oil field which utilizes such techniques.

Figure 6:
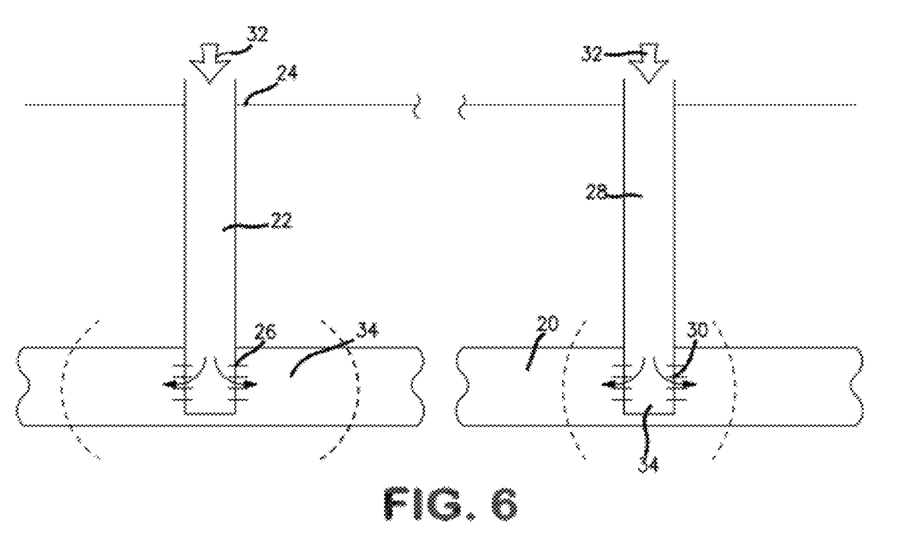
FIGS. 6 and 7 illustrate an injection and production method in accordance with the present invention.

FIG. 6 shows a reservoir 20 which would typically be a hydrocarbon bearing formation including porous media, having pore space filled with various fluids, one of which is a heavy or extra-heavy hydrocarbon which may contain asphaltenes. It is desired to produce the hydrocarbon to the surface for refining into various products. A production well 22 is shown extending from surface level 24 to formation 20, and having perforations 26 for allowing communication between well 22 and formation 20. An injection well 28 is similarly positioned from surface 24 to formation 20, and perforations 30 allow communication from well 28 to formation 20. In use, injection of driving fluids such as production water, water compatible with formation fluids, or brine as a carrier fluid with the surfactant and co-surfactant of the present invention into injection well 28 is used to drive fluids toward production well 22. This forms a water film over the natural adsorbed hydrocarbons (such as asphaltenes on the mineral surface of the rock) and allows mobilization of oil which was immobile due to affinity of such oil with the natural oil wet condition of the surface of the porous media. The mobilized oil is driven to the production well 22 and therefore fluid recovery through production well 22 is enhanced. In accordance with the present invention, the mixture of surfactant and co-surfactant as discussed above can advantageously be used in a method such as discussed herein. In such a method, it is advantageous to form a water film over the surfaces of porous media and adhered hydrocarbons in the vicinity of both the production well 22 and in the largest possible area of the reservoir that can be contacted with the injection fluids through the injection well 28. This can help to provide better flow and mobilization of the immobile oil in the porous media by breaking the affinity of the oil to the natural oil wet surface when the new water wet condition is reached by contact of the surfactant and co-surfactant of the present invention to form a water film as described above. Flow into the formation through well 28 as well as out of formation 20 into production well 22 is enhanced. Thus, a mixture of surfactants/co-surfactants as discussed above can be prepared and pumped into each of wells 22, 28 as schematically illustrated by arrows 32 in FIG. 6. This pumping positions the mixture through wells 22, 28 and into the zones 34, schematically illustrated by dashed lines in formation 20. The injection of fluid through well 28 can be continuous as long as desired after injection breakthrough in well 22. At this time, a decision should be made to continue to use well 28 as an injection well or to convert well 28 as a new production well and to locate a new injection well in formation 20 (not shown in FIG. 6) in communication with each of wells 22 and 28. As a production well, the well 28 can be monitored for cyclic stimulation of the vicinity of the well as described for the production well 22. After being pumped or naturally injected to formation 22 through injection well 28, this mixture is then held in position for a time sufficient to form a water film over the surfaces of porous media and also over adhered hydrocarbons as desired. In the case of the production well 22, when treatment is completed, the mixture can be pumped from the production well, and then well 22 (or other productions wells not shown including wells which had been injection wells 28) can be returned to production while continuously injecting the injection fluid through well 28.

Figure 7:
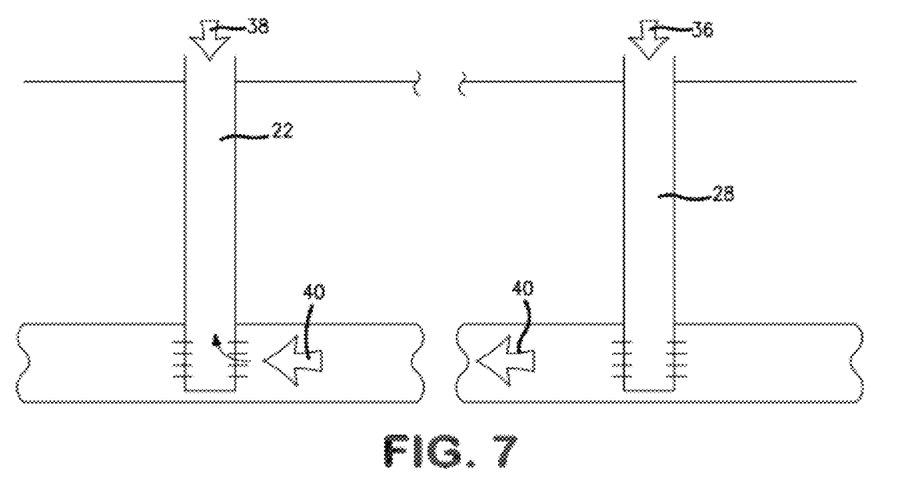

FIG. 7 shows this operation mode, and schematically illustrates injection of fluids 36 into well 28, and production of fluids 38 from production well 22. The enhanced flow of subterranean fluids from the vicinity of injection well 28 toward the vicinity of production well 22 is also schematically illustrated by arrows 40 shown in formation 20. The enhanced flow conditions around the perforations of well 22 create enhanced flow into production well 22 as desired, with a lower pressure drop and improved productivity. Reduced pressure drop in the vicinity of well 22 helps to reduce the rapid breakthrough of the injection fluid 36 to well 22, and also provides for better and more uniform flow through the areas between injection well 28 and into production well 22, with reduced risk of "channeling" and increasing mobilization of the immobile oil, breaking its affinity with the natural oil wet condition of the rock surface, where injected fluid modifies the surface to a water wet condition. Then, the path of flow of the injection fluid changes to a not contacted oil wet surface and the contact of this surface area with the surfactant and co-surfactant mixture changes to a water wet state, mobilizing immobile oil to flow through a new water wet surface to the producing well 22 until an economical rate of production can no longer be reached, at which time the method can be abandoned.

As with the embodiment discussed above, this process can be carried out while pressure at relevant locations is monitored, and when the pressure drops and production rates reach certain levels, the treatment with surfactant and co-surfactant according to the invention can again be conducted. The process can be carried out as well in vertical wells, deviated wells, horizontal and multilateral wells. Also, after breakthrough of the injected fluid in the production well production water can be separated from the producing stream and recycled back through the injection well after regeneration to the appropriated values of concentration of the surfactant and co-surfactant in the carrier fluid according to the invention, thereby lowering the amount of chemical substances required to prepare the injection fluid.

The following example further illustrates the invention and the results which are obtained using same.

Example 1

Crude oil and water from several wells in different areas of the Orinoco River Belt fields were collected. The oil and water were placed in closed glass vessels at several oil and water saturations, at reservoir conditions of water salinity and temperature, in a thermally controlled oven. Inside each vessel was placed a small glass plate which was monitored for wettability conditions starting with a water-wet condition and further being naturally changed to oil wet after a medium time period of about three to four weeks at reservoir temperature of 145° F. For each glass plate, wettability was measured by contact angle measurement techniques at the well temperature ranging from water-wet at the initial condition to oil wet after three weeks of aging process in the vessels at reservoir conditions.

Figure 3:
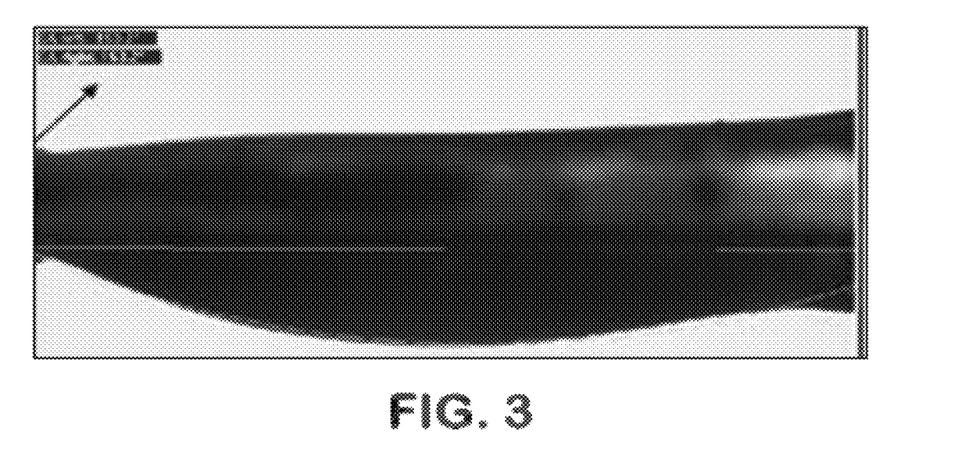
FIGS. 3 and 4 illustrate a test glass plate which is oil-wet in FIG. 3, and which has been treated in accordance with the present invention in FIG. 4.

After this treatment, the glass plates had a contact angle with oil which shows a strongly oil-wet condition as can be seen in FIG. 3, which shows the oil spreading over the plate surface.

Figure 4:
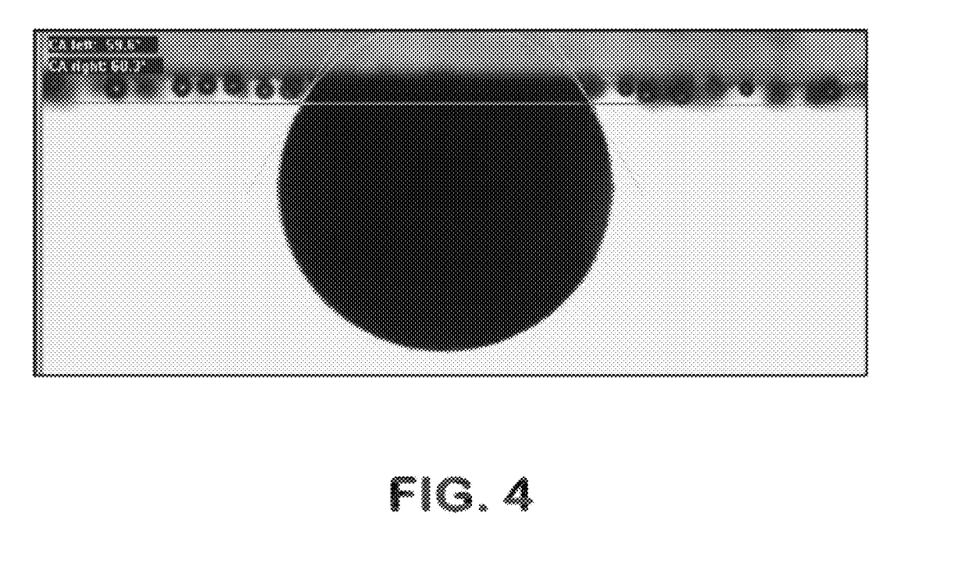

Each plate was then placed in a beaker for a soaking time with a mixture of equal amount of the well fluids in a mean average of 20% formation water and 82% extra heavy oil at 145° F. temperature, with the formulation of the present invention, which in this particular example comprised a solution of 0.5% volume of ethoxylated nonyl phenol with 30 ethoxylated groups and 0.5% volume of ethanol, both admixed with 99% of production water from the Cabrutica field of the Junín Division of The Orinoco River Belt. The mixture and the plate were held for an 8 hour exposure time at reservoir temperature of 145° F. and contact angle measurement showed wettability reversal from oil wet as shown in FIG. 3 to water wet as shown in FIG. 4. Note the bubbling up of the oil, and contact angle clearly indicative of the now water wet surface.

Similar results can be obtained by using various non-ionic and ionic surfactants. Suitable non-ionic surfactants include but are not limited to octilphenol having 9-16 EO, nonylphenol with an EO number from 4 to 80, preferably 20-80, fatty acids of 9-20 EO, n-tetradecanol of 9-20 EO, n-hexadecanol of 9-20 EO, laurate of sorbitan, and polyethoxylatedfatty alcohols with EO number from 4 to 25, preferably 9-20.

Suitable ionic surfactants include but are not limited to n-alkyl sulfates of K or Na, n-alkyl trimethyl ammonium chloride and combinations thereof.

Suitable co-surfactants include but are not limited to any alcohol of the series of n-alcohols (C1-C6), such as methanol, ethanol, propanol, butanol, pentanol, isopropanol and mixtures thereof.

The carrier fluid of the surfactant composition can be production water, brine or compatible water with the fluids of the reservoir, light oil, a light refinery cut, gasoil, diesel, diluent and water. The most preferred carrier fluid is water based fluid.

Figure 5:
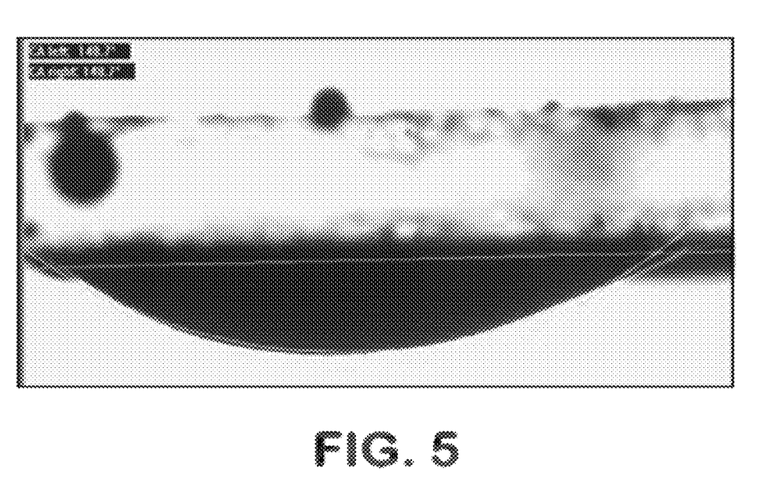
FIG. 5 shows the test plate is still oil-wet even after solvent cleaning.

Returning to the example, the glass plates were then soaked with a solution of mutual solvent for more than twenty four (24) hours to remove the water film and any visible hydrocarbon. The cleaned glass plates showed a clear and clean surface, but when a drop of water was placed on the plate, the water drop did not spread on the surface. The contact angle was measured and the plate still exhibited an oil-wet condition, as shown in FIG. 5.

This indicates that even though the mineral surface, such as sandstone, feldspar, clays or the like can be cleaned of adhered hydrocarbons still on that surface, there remains a chemically adsorbed film of hydrocarbon and therefore on such a mineral surface there exists a strong oil-wet wetability. As mentioned previously, the oil-wet wetability is the most adverse condition for the recovery of oil in a porous media. Thus, even by undertaking the cost and steps of removing the adhered asphaltenes, the resulting cleaned surface remains oil wet.

Use of the formulation and method of the present invention creates a water film on the mineral surface, covering the previously chemically adsorbed hydrocarbons. This film creates an interface that will conduct hydrocarbon flow for very long periods of time between stimulation cycles in the production well, and allows mobilization of oil which is immobile due to its affinity to the natural oil wet condition of the rock when the water film is formed in the porous media through injection from the injection well. A very low pressure drawdown is achieved with the increased oil flow rates in the production well and very low pressure drop occurs in the injection well so as to make the injection by natural flow, thereby providing great benefits to the productivity and final recovery of oil from the drained area of the well and the whole reservoir.

Example 2

A laboratory test was conducted for evaluating relative permeability with extraheavy crude oil and formation water and INTESURF™ 3PW0.5 solution prepared according to the invention with production water from the Cabrutica field of the Junín Division of the Orinoco River Belt Basin in Venezuela, and using a core of well E20P15 and formation fluids of well DE 22 12 of the same field.

The core from a depth of 2212.2 feet from Cabrutica field was taken, and two samples were packed for use in a confined cell, one sample for return permeability testing and the other sample for relative permeability testing of extraheavy oil and formation water and extraheavy oil and INTESURF 3PW0.5 solution. The samples were cleaned, restored and aged for 16 days at the reservoir temperature of 120° F. and pressure of 400 psi in a confined cell. An imbibition Amott test was performed to both samples to insure an oil wet condition of the sample before the tests. The core properties for two samples are shown in Table 1.

TABLE 1

COMPANY INTEVEP S.A
CORE FROM WELL E20P15 CABRUTICA FIELD VENEZUELA

| Sample # | Confining pressure PSI | Weigth Total | Long | Diam | Results Ø to Helio | | | | | PERMEABILYTY | |
|---|---|---|---|---|---|---|---|---|---|---|---|
| | | | | | Vol. grain | Vol Pore space | Density grain | Ø | Vol Total | Air | Klink. |
| 1A | 1300 | 86.03 | 4.875 | 3.596 | 30.67 | 17.42 | 2.632 | 36.2 | 48.09 | 2697 | 2605 |
| 2B | 1300 | 96.42 | 5.143 | 3.702 | 34.42 | 19.22 | 2.628 | 35.8 | 53.64 | 2596 | 2507 |

INTESURF 3PW0.5 solution is a mixture of 99% V/V production water from the Cabrutica field and a 0.5 V/V of nonylphenol ethoxylated with 30 ET groups, and 0.5 V/V % methanol. 1 lb/bbl of potassium acetate is added for clay control to the final admixture.

Return Permeability Test

Figure 8:
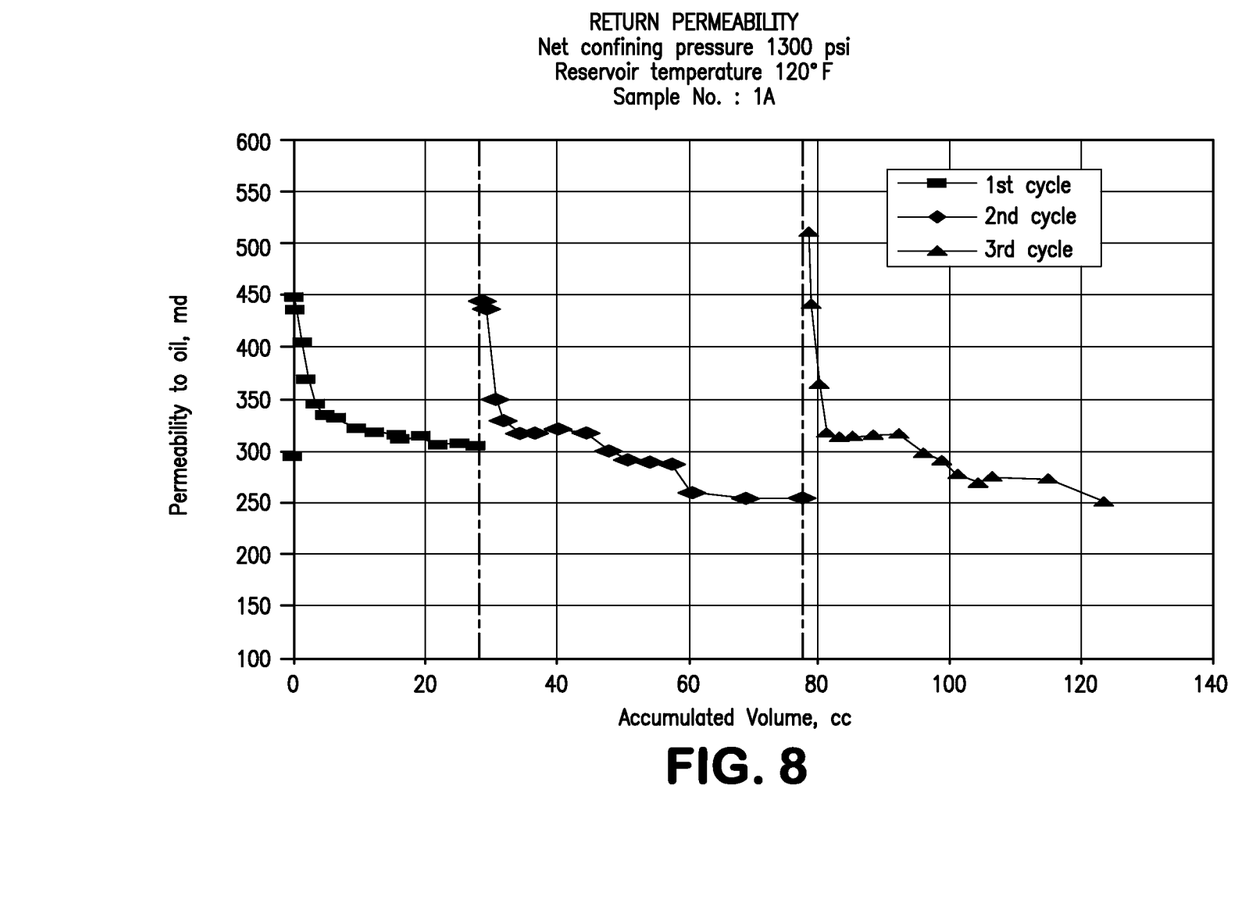
FIG. 8 illustrates results of use of the present invention in the form of a return permeability test with several treatments cycles in accordance with the present invention.

Core sample 1A with an oil wet condition confirmed by the imbibition Amott test was placed in the confined cell at 1300 psi confining pressure. Thereafter extraheavy live crude oil from well DE 22 12 of Cabrutica field was displaced until a constant pressure drop was achieved. The permeability to oil (Ko) at the initial water saturation was measured and this value was taken as the reference base relative permeability to oil in the sample. Three cycles of returned permeability test were made, and previous to each cycle, 10% of the porous volume of the sample was squeezed with the INTESURF™ 3PW0.5 solution into the production end of the core sample, and the same volume allowed to be discharged from the opposite end of the core sample. A soaking time of 24 hours was allowed to each cycle before the displacement of live crude oil was restarted. The rate of flow and the pressure drop was monitored and the permeability to oil at several points of porous volume displaced was measured. FIG. 8 exhibits the return permeability test results for each cycle and Table 2 the values from the test obtained.

A stimulation state was found in all cycles suggesting the cyclic stimulation of the sandstone-production end zone as a productivity improvement of the well by reducing the pressure drop and increasing the production of extraheavy oil from the well. No formation damage was observed even after a large amount relative to porous volume of live extraheavy oil was displaced and desorption of the surfactants of Intesurf in the porous media occurs. After restimulation with the Intesurf solution, a better condition of relative permeability to oil is achieved. It is believed that the relative permeability to oil lost after a great volume of displacement of oil and after several cycles of squeezes is due to the new water saturation without Intesurf base surfactant increases in the porous media. However, it is observed that once the surfactant is available by restimulation in the porous media, a new improvement of the oil relative permeability is achieved and even reaches levels higher than earlier cycles.

A relative permeability test of extraheavy oil and formation water and extraheavy oil and INTESURF 3PW0.5 solution with production water was then conducted.

Core sample 2B was insured to have an oil wet condition by Amott imbibition test and thereafter was placed in a confined

TABLE 2

RETURN PERMEABILITY
Net confining presure 1300 psi
Reservoir temperature 120° F.

Company: INTEVEP  
Well: E20-P15  
Field: Cabrutica  
(Intesurf Plus)  
Stimulation fluid: INTESURF 3PW 0.5  
INTESURF Carrier fluid: Production water  
Squeezed stimulation fluid: 10% porous volume Sample No. 1A  
Depth 2212.2 ft  
Porosity 0.354 fraction  
KKklinkemberg 2295 md  
(Ko) K to oil 294 md

| 1er cycle Vol. Acum., cc | 2do cycle Vol. Acum., cc | 3er cycle Vol. Acum., cc | 1er cycle K to oil, md | 2do cycle K to oil, md | 3er cyccle K to oil, md | Skin factor SF = 1 − K/Ko |
|---|---|---|---|---|---|---|
| 0.19 | 28.58 | 78.58 | 448 | 444 | 511 | −0.737 |
| 0.35 | 29.61 | 79.08 | 436 | 437 | 442 | −0.502 |
| 1.14 | 30.93 | 80.37 | 405 | 350 | 366 | −0.243 |
| 2.30 | 32.28 | 81.51 | 369 | 328 | 318 | −0.081 |
| 3.38 | 34.45 | 83.43 | 344 | 318 | 315 | −0.069 |
| 4.93 | 36.48 | 85.30 | 334 | 317 | 315 | −0.070 |
| 6.48 | 40.02 | 88.41 | 331 | 321 | 316 | −0.074 |
| 9.68 | 44.38 | 92.16 | 322 | 318 | 318 | −0.081 |
| 12.45 | 47.67 | 95.64 | 318 | 301 | 299 | −0.017 |
| 15.60 | 50.97 | 98.39 | 316 | 292 | 293 | 0.004 |
| 16.50 | 54.22 | 101.42 | 311 | 290 | 278 | 0.054 |
| 19.50 | 57.39 | 104.21 | 314 | 287 | 271 | 0.080 |
| 22.39 | 60.42 | 106.78 | 306 | 260 | 276 | 0.063 |
| 25.36 | 69.24 | 115.14 | 307 | 254 | 274 | 0.069 |
| 28.13 | 77.50 | 123.55 | 304 | 255 | 252 | 0.143 | cell at confine pressure of 1300 psi. Temperature was that of the reservoir of 120° F. Extraheavy oil was displaced at a pressure of 1000 psi until a constant flow was achieved. The relative permeability effective to oil was measured at the initial water saturation. Thereafter, formation water was displaced at a constant rate of 1 cc/min and monitoring of the produced fluids and pressure drop was made until no flow of extraheavy oil is observed. The effective water permeability at the residual oil saturation is measured for each sample and the volume of extraheavy oil produced at room conditions is corrected to reservoir conditions using the viscosity and volumetric factor of the reservoir. The final saturation of the fluids is determined by material balance. The effective permeability of each phase is calculated using Darcy's Law. The relative permeability water-extraheavy oil and Intesurf solution-extraheavy oil ratios at non-stable state were calculated using the methods of Jones and Roszelle.

Figure 9:
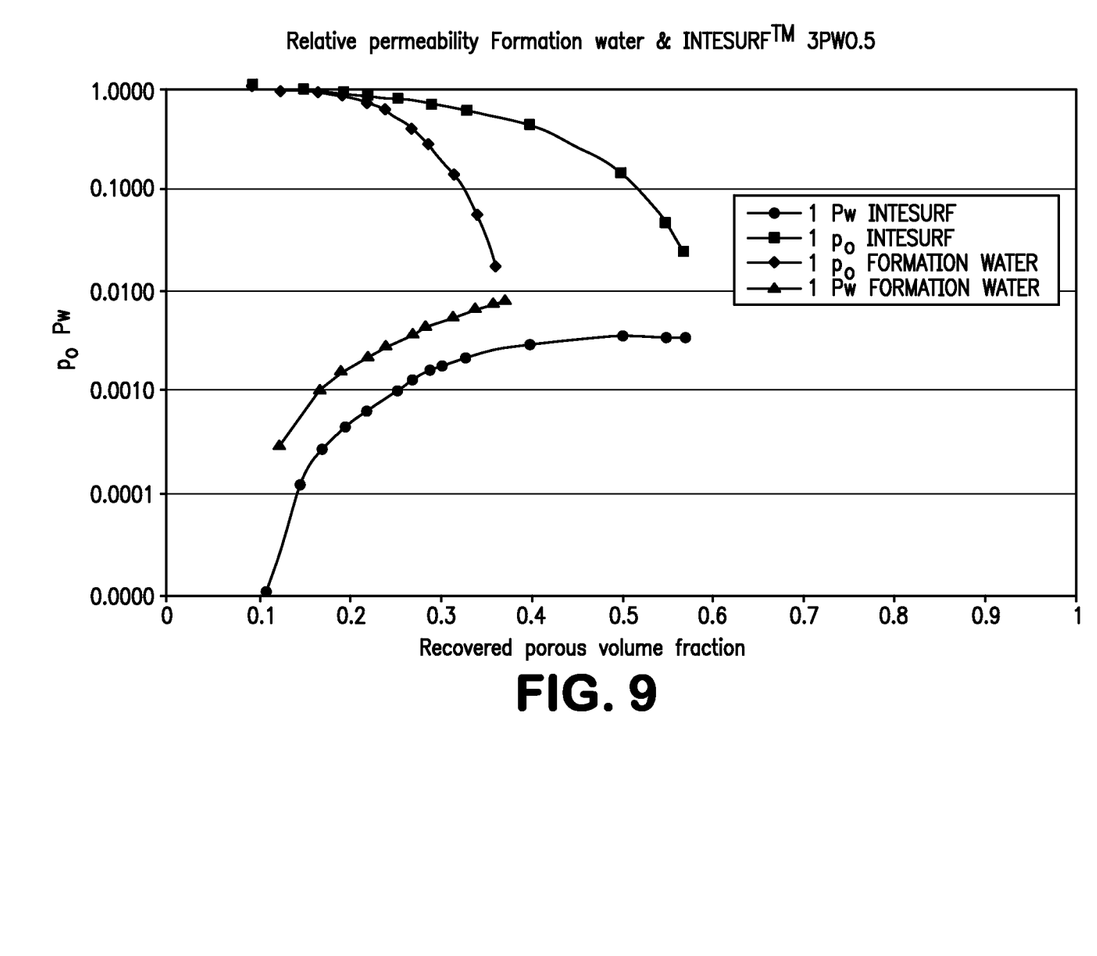
FIG. 9 further illustrates a relative permeability curve for formation water and for production water with surfactant and co-surfactant of the present invention.
Figure 10:
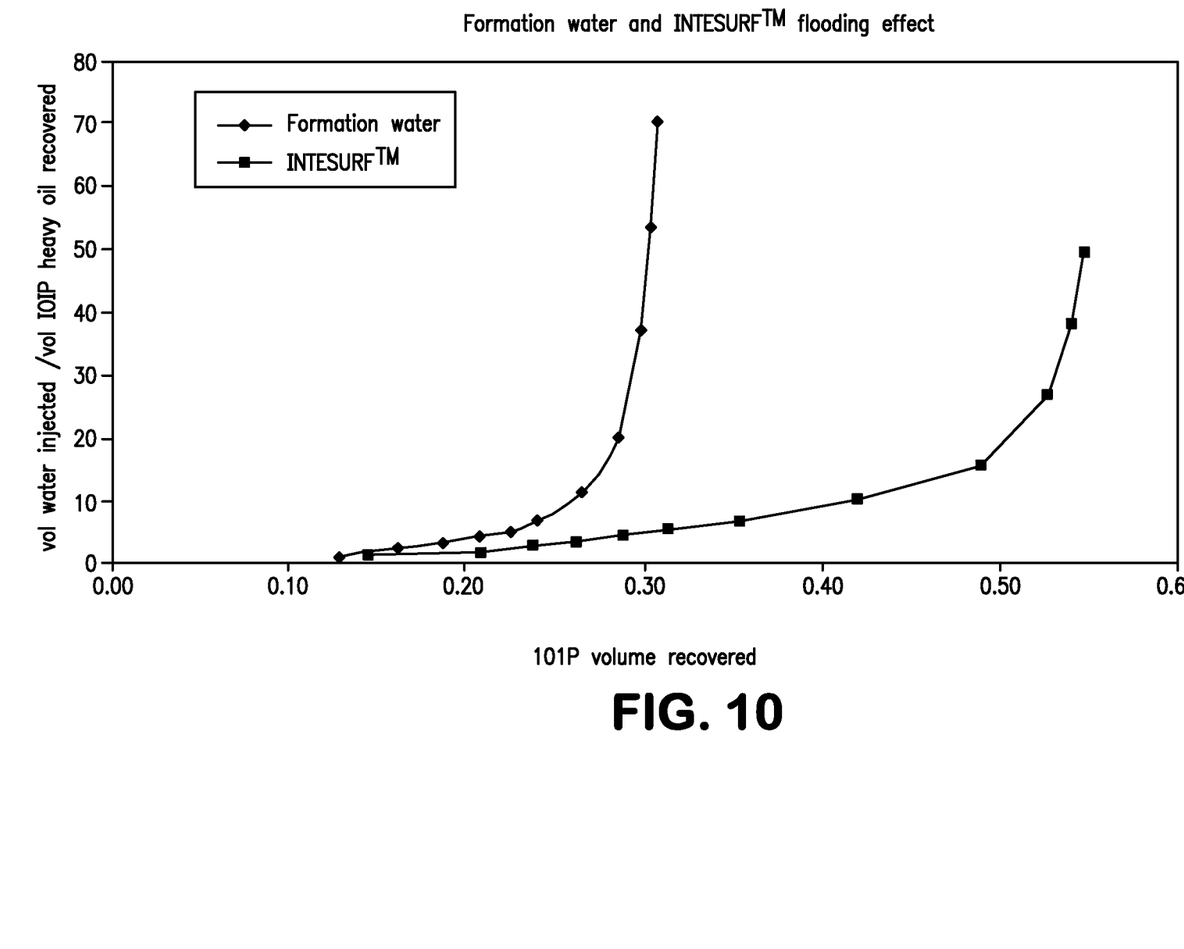
FIG. 10 illustrates the relation of volume of produced water with INTESURF required to a volume of recovery of the IOIP for the test done.

Once the formation water-extraheavy oil test was run extraheavy crude was displaced for the core sample until a condition of initial water saturation and extraheavy oil saturation was achieved. In this state the permeability effective to oil was measured and displacement with the solution of INTESURF 3 PW0.5 took place with a rate 0.1 cc/min for 8 hours allowing a soaking time of 12 hours and so on until only solution of INTESURF™ 3 PW0.5 was collected as the production without any extraheavy oil. The final recovery of extraheavy oil was 10.02 cc which is a 52.13% of the total porous volume and 57.89% of the original extraheavy oil in place. FIG. 9 exhibits the behavior of Ko Kw vs the water saturation for the two testing fluids and FIG. 10 exhibits the ratio of the quantity of production water with the surfactant and co-surfactant used as the injected fluid to the quantity of recovered oil of the initial oil in place recovered from the plug of the core sample. From the figure, it can be observed that 14% of the initial oil in place (IOIP) can be recovered using a mean relation of 1 unit of oil produced by 1.6 volume of mixture of surfactant and co-surfactant and produced water injected. Also an additional 20% recovery of the (IOIP) can be recovered using a mean relation of 1 unit of oil in place produced by each 3.2 volume of mixture of surfactant and co-surfactant and carrier fluid injected after the first 14% of initial IOIP recovered.

Example 3

The well CD 1405 from the Cabrutica field in the Junín Division of the Orinoco River Belt was selected for a pilot test for stimulation and cyclic re-stimulation with the composition and method of the present invention for a production well.

Figure 11:
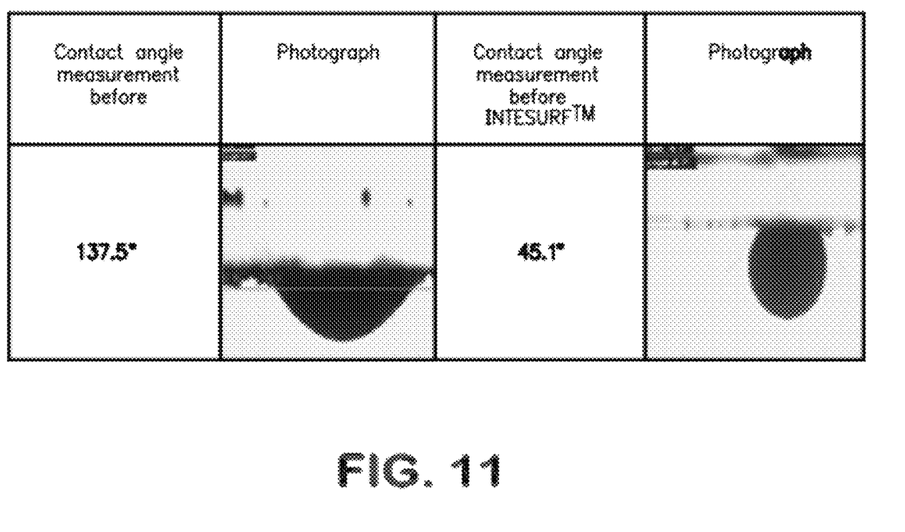
FIG. 11 illustrates a test glass plate before the plate is treat with the formulation and after treatment and 24 hours soaking time with fluids of the well CD 1405.

Crude oil and formation water from well CD1405 were collected as well as production water from disposal tank 903 from the principal station of Cabrutica field in the Orinoco River Belt field. The characteristics of the crude oil and formation water are:
OIL:
Saturated %: 8 wt
Aromatics %: 44 wt
Resins %: 35 wt
Asphaltenes %: 13 wt
Acidity: 3.90 mg KOH/g Viscosidad CP 10,420 at 145 F
API: 9%
% C wt 84.55%
% H wt 11.12
Formation Water with 2,500 ppm NaCl The oil and formation water were placed in closed glass vessels at 20% vol. saturation of formation water and 80% vol. of oil saturation, at reservoir conditions of temperature of 145° F., in a thermally controlled oven. Inside each vessel was placed a small glass plate which was monitored for wettability conditions starting with a water-wet condition and further being naturally changed to oil wet after a time period of aging of three weeks at reservoir temperature of 145° F. For the glass plate, wettability was measured by contact angle measurement techniques at the well temperature ranging from water-wet at the initial condition to oil wet after three weeks of the aging process in the vessels at reservoir conditions as shown in FIG. 11, indicating contact angle of 137.5° at the aged condition. This is as it would be found in the reservoir, showing oil spreading over the plate surface.

The plate was then placed in a beaker for a soaking time with a mixture of equal amounts of the well fluids in a mean average of 20% vol. formation water and 80% vol. of the 9° API extra heavy oil at 145° F. temperature, with the formulation of the present invention, which in this particular example comprised a solution of 0.5% vol. of ethoxylated nonyl phenol with 30 ethoxylated groups and 0.5% vol. of ethanol, both admixed with 99% vol. of production water from the disposal tank of the Cabrutica field of the Junín Division of The Orinoco River Belt. 1 lb/bbl of potassium acetate was added to the formulation for clay control. The mixture and the plate were held for a 24 hour exposure time at reservoir temperature of 145° F., and contact angle measurement showed wettability reversal from oil wet of 137.5° to water wet with a contact angle of 45.1°. Bubbling up of the oil and measured contact angle were clearly indicative of a now water wet surface.

This test confirms the wettability change in the well after application of the invention treatment to the porous media.

Thereafter, a first stimulation job was prepared for the well, injecting by the annular space between the casing and the production tube 350 barrels of the formulation of the present invention in an oil based carrier fluid. The injection fluid was prepared with 3.5 barrel of ethoxylated tridecanol of 17 ethoxylated oxide groups, 3.5 barrels of methanol and 343 barrels of gasoil. The fluid was pumped with a pumping truck. A soaking time of 24 hours was allowed to the well, and production restarted. Production increase was from a mean value before of 183 bopd to a mean of 445 bopd after the treatment.

An eight months period of time after the first stimulation job, a new re-stimulation job was executed to the well, but now a water based injection fluid was prepared. Another amount of 350 barrels of the injecting fluid was pumped by the annular space between the casing and the production tube to the formation pore space using potable water from a water well based carrier fluid. The injection fluid was prepared with 3.5 barrel of ethoxylated nonylphenol of 20 ethoxylated oxide groups, 3.5 barrels of methanol and 343 barrels of water. The fluid was pumped with a pumping truck. A soaking time of 24 hours was allowed to the well, and production restarted. Production increase was from a mean value of 183 bopd to a mean of 358 bopd.

Table 3 shows the CD1405 reservoir and completion well parameters for the CD 1405 well.

TABLE 3

| WELL CD 1405 RESERVOIR INFORMATION | | | | |
|---|---|---|---|---|
| Reservoir | OFINF SDZ-2X A1 | | | |
| Sand | 2C | | | |
| Horizontal side length (MD), ft | 5150' | Tope 2,710 ft | Base | 7,860 ft |
| Permeability, md | 8,900 | | | |
| Porosity, % | 32 | | | |
| Temperature, ° F. | 126 | | | |
| Crude oil gravity, °API | 9 | | | |
| Actual Pressure, psi | 420 | | | |
| Well drilling date | Jul. 02, 2009 | | | |
| Production Method | Progressive cavity pump | | | |
| Type of well | Horizontal | | | |

Example 4

Two highly deviated Orinoco River Belt wells (CD36 and CD37) from the Cerro Negro area of the Carabobo Division of the Orinoco River Belt basin were selected for pilot testing using oleic base formulation. Main characteristics of the wells are:

| Well name | Reservoir name | Completion Date | Porosity % | K Darcy | Vsh | Thickness ft | Production Method | Original pressure psi | Actual pressure psi | Lithology |
|---|---|---|---|---|---|---|---|---|---|---|
| CD 36 | OFIM CNX9 | April 1992 | 33 | 2.3 | 5.3 | 194 | Mechanical pump & Gravel pack | 1100 | 1095 | sandstone |
| CD 37 | OFIM CNX9 | February 1993 | 32 | 5 | 7.0 | 192 | PCP Gravel pack | 1350 | 1000 | sandstone |

An amount of 270 barrels of diluent, which is a light crude oil of 23 API oil gravity, was admixed with a previously homogenized mix of 1.3 barrels of tridecyl alcohol of 12 EO groups and 1.3 barrels of methanol in a tank of a pumping truck. The admixture was recirculated in the tank for homogenization and pumped to well CD 36 through the annular space between the tubing and the casing. The stimulation fluid contacted the gravel pack downhole and passed to about two feet penetration in the formation. The well was closed for a soaking period of 24 hours. The well was restarted thereafter and showed an increased production of about 200 bpd that has been stable for a period of 60 days.

Another amount of 133 barrels of diluent, a light crude oil of 23 API gravity was admixed with a previously homogenized mix of 0.7 barrels of tridecyl alcohol of 12 EO groups and 0.7 barrels of methanol in a tank of a pumping truck. The admixture was recirculated in the tank for homogenization and pumped to well CD 37 through the annular space between the tubing and the casing. The stimulation fluid contacted the gravel pack downhole and passed to about two inches of penetration in the formation. The well was closed for a soaking period of 24 hours. The well was restarted thereafter and showed a production of 80 barrels net of oil per day and has been stable for a period of 60 days thereafter. The net oil production before the stimulation was 24 barrels of net oil.

These pilot tests establish that the stimulation fluid, or formulation, of the present invention is highly effective at improving hydrocarbon flow and production through porous media treated with the fluid. The fluid is made from readily available constituents, and the method can be carried out using known equipment already available for injecting other well stimulation fluids.

Based upon the foregoing, a beneficial change in permeability, production levels and recovery of the initial oil in place is demonstrated by using the formulation and method of the present invention.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

We claim:

1. A combined injection and production method, comprising the steps of:
    establishing a production well and an injection well into a hydrocarbon-bearing formation;
    introducing a mixture of a surfactant, a co-surfactant and a carrier fluid into each of the production well and the injection well so that the mixture flows into porous media surrounding the production well and the injection well;
    holding the mixture in the porous media surrounding the production well in the presence of water for a period of time sufficient to form a water film on surfaces of the porous media surrounding the production well; and
    injecting an injection fluid into the injection well while producing from the production well, whereby hydrocarbons flow from the porous media around the injection well toward the production well.

2. The method of claim 1, wherein the surfaces of the porous media prior to treatment with the mixture have hydrocarbons adhered to them, and wherein the water film is formed over the surfaces and the hydrocarbon adhered to the surfaces.

3. The method of claim 1, wherein the holding step mobilizes hydrocarbons adhered to the porous media, and the injecting step produces mobilized oil from the production well.

4. The method of claim 1, wherein the surfactant is selected from the group consisting of anionic surfactants, cationic surfactants, nonionic surfactants, amphoteric surfactants and combinations thereof.

5. The method of claim 1, wherein the carrier fluid is selected from the group consisting of organic solvents, light hydrocarbons, diluents, light crude oil, water, brine, production water and combinations thereof.

6. The method of claim 1, wherein the carrier fluid is a production water with a salinity over 5000 ppm and potassium content over 80 ppm.

7. The method of claim 1, wherein the surfaces of the porous media define pore space for the hydrocarbon, and wherein the surfaces are defined by a material selected from quartz, feldspar, siliceous mineral, carbonaceous mineral, clays, and combinations thereof.

8. The method of claim 1, wherein the carrier fluid is a regenerated water produced from the producing well after breakthrough of injected water from the injection well to the reservoir.

9. The method of claim 1, further comprising the steps of:
separating produced water from a production stream of the producing well;
measuring concentration of the surfactant and co-surfactant in the produced water; and
adjusting concentration of the surfactant and the co-surfactant to a desired injection fluid value.

10. The method of claim 1, wherein the co-surfactant is an alcohol co-surfactant.

11. The method of claim 10, wherein the alcohol co-surfactant is selected from the group consisting of methanol, ethanol, propanol, butanol, pentanol, isopropanol, and combinations thereof.

12. The method of claim 1, wherein the porous media is a subterranean hydrocarbon bearing formation containing asphaltene and wherein the asphaltene is adhered to the surfaces of the porous media.

13. The method of claim 12, wherein the hydrocarbon has an API gravity of between 6 and 16.

14. The method of claim 12, wherein the hydrocarbon has an API gravity of between 6 and 12.

15. The method of claim 1, wherein the surfactant is an ethoxylated nonylphenol having between 4 and 80 ethoxylated groups, and wherein the co-surfactant is selected from the group consisting of methanol, ethanol and combinations thereof.

16. The method of claim 15, wherein the mixture contains equal amounts by volume of surfactant and co-surfactant.

17. The method of claim 15, wherein the mixture contains each of the surfactant and the co-surfactant at a concentration of between 0.001 and 5% vol.

18. The method of claim 15, wherein the mixture contains each of the surfactant and the co-surfactant at a concentration of between 0.01 and 3% vol.

19. The method of claim 1, wherein the mixture introduced into the production well is different from the mixture introduced into the injection well.

20. The method of claim 19, wherein the mixture introduced into the production well contains each of the surfactant and the co-surfactant at a concentration of between 0.5 and 5.0% vol.

21. The method of claim 20, wherein the mixture introduced in the production well contains each of the surfactant and the co-surfactant at a concentration of between 1 and 4% vol.

22. The method of claim 20, wherein the mixture introduced into the injection well contains each of the surfactant and the co-surfactant at a concentration of between 0.001 and 3% vol.

23. The method of claim 22, wherein the mixture introduced into the injection well contains each of the surfactant and the co-surfactant at a concentration of between 0.01 and 0.5% vol.

* * * * *